(12) United States Patent
Hou

(10) Patent No.: US 10,666,001 B2
(45) Date of Patent: May 26, 2020

(54) CHARGING PLUG AND CHARGING STRUCTURE

(71) Applicant: Leadtek Research Inc., New Taipei (TW)

(72) Inventor: Ting-Teng Hou, New Taipei (TW)

(73) Assignee: Leadtek Research Inc., New Taipei (TW)

( * ) Notice: Subject to any disclaimer, the term of this patent is extended or adjusted under 35 U.S.C. 154(b) by 19 days.

(21) Appl. No.: 16/180,015

(22) Filed: Nov. 5, 2018

(65) Prior Publication Data

US 2019/0190290 A1     Jun. 20, 2019

Related U.S. Application Data

(60) Provisional application No. 62/608,567, filed on Dec. 20, 2017.

(51) Int. Cl.
| | | |
|---|---|---|
| *H01R 13/00* | (2006.01) | |
| *H01R 24/68* | (2011.01) | |
| *H01R 13/627* | (2006.01) | |
| *H02J 7/00* | (2006.01) | |
| *H01R 13/193* | (2006.01) | |
| *H01R 13/631* | (2006.01) | |
| *H01R 13/24* | (2006.01) | |

(Continued)

(52) U.S. Cl.
CPC ........... *H01R 24/68* (2013.01); *H01R 13/193* (2013.01); *H01R 13/6272* (2013.01); *H02J 7/0042* (2013.01); *H01R 13/24* (2013.01); *H01R 13/46* (2013.01); *H01R 13/6275* (2013.01); *H01R 13/631* (2013.01); *H01R 2103/00* (2013.01)

(58) Field of Classification Search
None
See application file for complete search history.

(56) References Cited

U.S. PATENT DOCUMENTS

| | | | | |
|---|---|---|---|---|
| 5,501,607 A | * | 3/1996 | Yoshioka | ................. B60K 1/04 439/142 |
| 5,545,046 A | * | 8/1996 | Masuda | ................... B60K 1/04 439/142 |

(Continued)

FOREIGN PATENT DOCUMENTS

| | | | | | |
|---|---|---|---|---|---|
| CN | 101459265 A | * | 6/2009 | ............ | H01M 10/42 |
| CN | 103187742 A | * | 7/2013 | ............. | H01H 85/62 |
| CN | 107623223 A | * | 1/2018 | ............. | H01H 85/62 |

*Primary Examiner* — Leigh M Garbowski
(74) *Attorney, Agent, or Firm* — JCIPRNET

(57) ABSTRACT

A charging plug includes a housing, two charging pins, and an elastic piece. The housing includes a main body portion having an arrangement surface and a protruding portion. The protruding portion is connected to the main body portion and located on the arrangement surface. The protrusion portion has an upper surface, a first side surface and a second side surface opposite each other and connecting to the upper surface. The charging pins are disposed in the housing and extend out of the protrusion portion. The elastic piece is disposed on the protruding portion of the housing and located between the charging pins. The elastic piece covers the first side surface, the upper surface and the second side surface and has at least one positioning portion, and the positioning portion is adapted to be engaged with at least one slot of a casing.

10 Claims, 9 Drawing Sheets

(51) Int. Cl.
    *H01R 103/00*      (2006.01)
    *H01R 13/46*      (2006.01)

(56) References Cited

U.S. PATENT DOCUMENTS

| | | | |
|---|---|---|---|
| 5,687,234 A * | 11/1997 | Chang | H01R 31/065 |
| | | | 379/446 |
| 7,749,002 B1 * | 7/2010 | Chiang | H01R 13/52 |
| | | | 439/135 |
| 10,205,199 B2 * | 2/2019 | Ichigaya | H01M 2/1066 |
| 10,355,424 B2 * | 7/2019 | Messinger | H02J 7/00 |
| 2005/0110456 A1 * | 5/2005 | Jeong | H01M 2/1094 |
| | | | 320/111 |
| 2015/0380886 A1 * | 12/2015 | Oosterman | H01R 27/02 |
| | | | 439/639 |
| 2018/0248275 A1 * | 8/2018 | Morita | H01R 13/5213 |

\* cited by examiner

CHARGING PLUG AND CHARGING STRUCTURE

CROSS-REFERENCE TO RELATED APPLICATION

This application claims the priority benefit of U.S. provisional application Ser. No. 62/608,567, filed on Dec. 20, 2017. The entirety of the above-mentioned patent application is hereby incorporated by reference herein and made a part of this specification.

BACKGROUND

Field of the Disclosure

The disclosure relates to a charging element, and particularly relates to a charging plug and a charging structure including the charging plug.

Description of Related Art

Currently in the market, electronic products with rechargeable batteries, such as wristband, watch, mobile phone, game machine, or navigator, have many types of charging structures. For example, the disadvantages of the charging structure having the seat-type charger are high development cost, requirement of large storage space, inconvenience of carrying, the cost the magnetic pogo pin type charging structure is too high, and the clamping type charging structure has considerations about cost, shape and space. Moreover, the common Micro USB charging structure is a systematic structure and has disadvantages as having no waterproof function and unabling to be customized. Therefore, it is urgent in industry to develop a charging structure having great design flexibility, small volume, and low cost.

SUMMARY

The disclosure provides a charging plug capable of engaging with the slot of the casing through the positioning portion of the elastic piece of the charging plug, and suitable for various locations in spatial structure design.

The disclosure provides a charging structure including the charging plug and capable of greatly improving structural stability when the charging plug is plugged into a casing.

A charging plug of the disclosure includes a housing, two charging pins, and an elastic piece. The housing includes a main body portion and a protruding portion. The main body portion has an arrangement surface. The protruding portion is connected to the main body portion and located on the arrangement surface. The protruding portion has an upper surface, the first side surface, and the second side surface. The first side surface and the second side surface are opposite each other and connect to the upper surface. The charging pins are disposed in the housing and extend out of the protrusion portion. The charging pins are separated from each other and arranged in parallel. The elastic piece is disposed on the protruding portion of the housing and located between the charging pins. The elastic piece covers the first side surface, the upper surface and the second side surface and has at least one positioning portion, and the positioning portion is configured to engage with at least one slot of a casing.

In one embodiment of the disclosure, the charging plug further includes a reset pin, and the reset pin is disposed in the housing and located between the charging pins. The elastic piece covers the reset pin.

In one embodiment of the disclosure, the positioning portion of the elastic piece is located at a junction of the upper surface and the first side surface of the protruding portion.

In one embodiment of the disclosure, wherein the outer edge of the second side surface of the protruding portion has a plurality of chamfered bevels.

A charging structure of the disclosure includes a casing and a charging plug. The casing has a charging slot, at least one slot and two charging terminals. The slot communicates with the charging slot, and the charging terminals are located in the charging slot. The charging plug is detachably plugged in the charging slot of the casing. A charging plug includes a housing, two charging pins, and an elastic piece. The housing includes a main body portion and a protruding portion. The main body portion has an arrangement surface. The protruding portion is connected to the main body portion and located on the arrangement surface. The protruding portion has an upper surface, the first side surface, and the second side surface. The first side surface and the second side surface are opposite each other and connect to the upper surface. The charging pins are disposed in the housing and extend out of the protrusion portion. The charging pins are separated from each other and arranged in parallel. The elastic piece is disposed on the protruding portion of the housing and located between the charging pins. The elastic piece covers the first side surface, the upper surface and the second side surface and has at least one positioning portion. When the charging plug is plugged in the charging slot, the charging pins are respectively in contact with the charging terminals, and the positioning portion of the elastic piece engages with the slot, so that the charging plug is fixed to the casing.

In one embodiment of the disclosure, the charging plug further includes a reset pin, and the reset pin is disposed in the housing and located between the charging pins. The elastic piece covers the reset pin.

In one embodiment of the disclosure, the casing further has a reset terminal, the reset terminal is disposed in the charging slot and located between the charging terminals. When the charging plug is plugged into the charging slot, the reset pin is corresponding to the reset terminal and the elastic piece is in contact with the reset terminal.

In one embodiment of the disclosure, the positioning portion of the elastic piece is located at a junction of the upper surface and the first side surface of the protruding portion.

In one embodiment of the disclosure, wherein the outer edge of the second side surface of the protruding portion has a plurality of chamfered bevels.

In one embodiment of the disclosure, the at least one slot comprises a guiding slot and a drain slot. The guiding slot is located in the casing and the charging slot communicates with the outside through the drain slot. When the charging plug is plugged into the charging slot, the positioning portion of the elastic piece engages with the guiding slot or the drain slot.

Based on the above, in the design of the charging plug of the disclosure, the elastic piece has a positioning portion configured to engage with the slot of the casing. Therefore, through the structural engagement method, the charging plug is firmly plugged into the casing for charging. As a result, the structural stability of the charging structure including the charging plug is greatly improved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
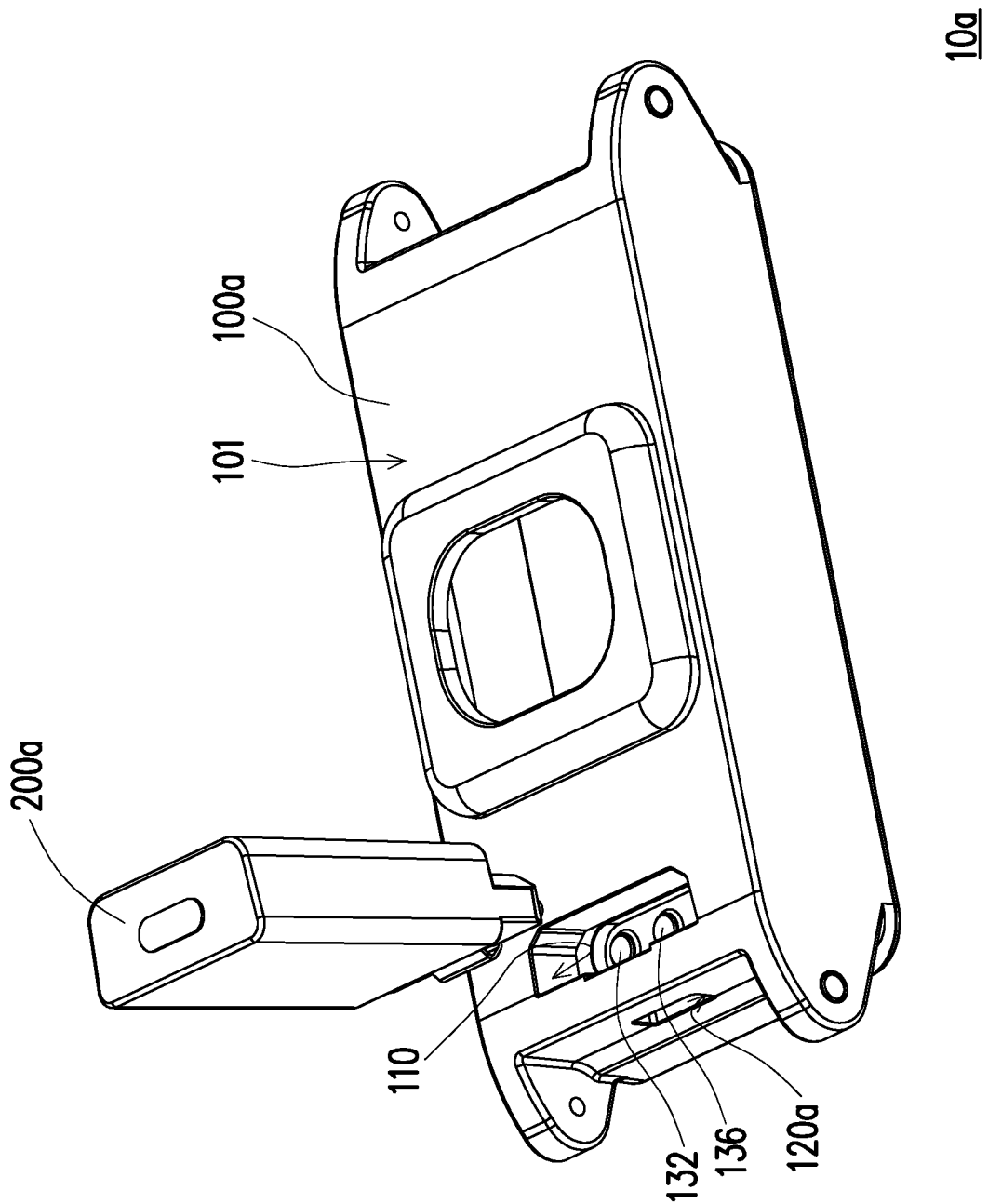
FIG. 1A is a perspective schematic view showing a charging structure of an embodiment of the disclosure.
Figure 1B:
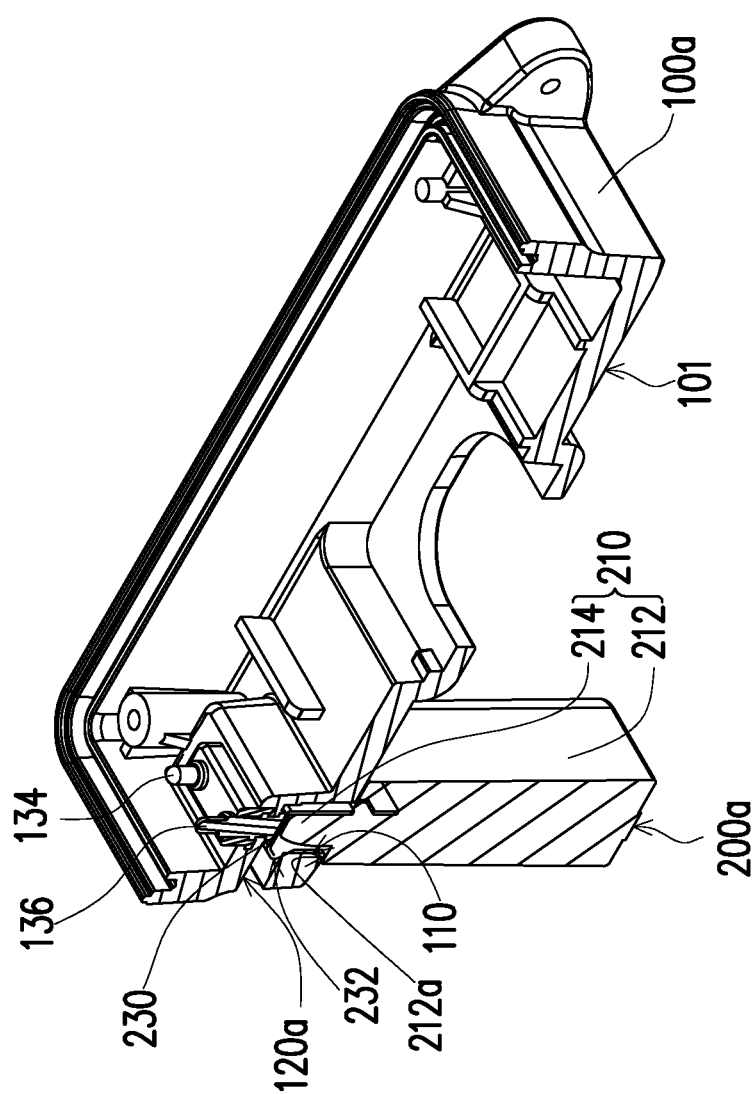
FIG. 1B is a perspective cross-sectional schematic view showing a part of the charging structure in FIG. 1A.
Figure 1C:
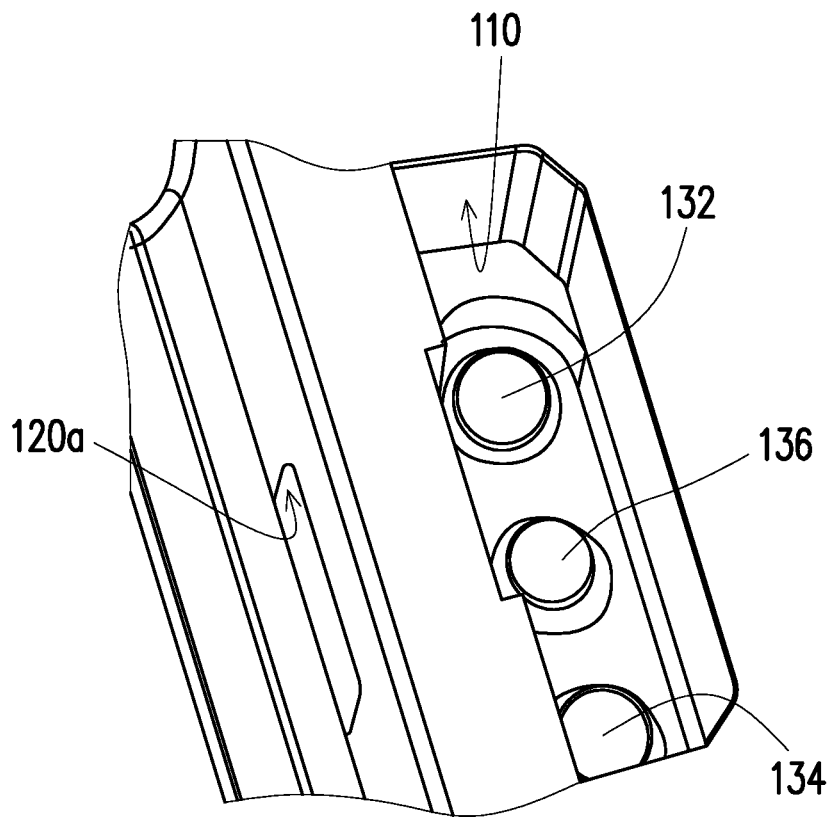
FIG. 1C is a partially enlarged schematic view showing a casing of the charging structure in FIG. 1A.
Figure 1D:
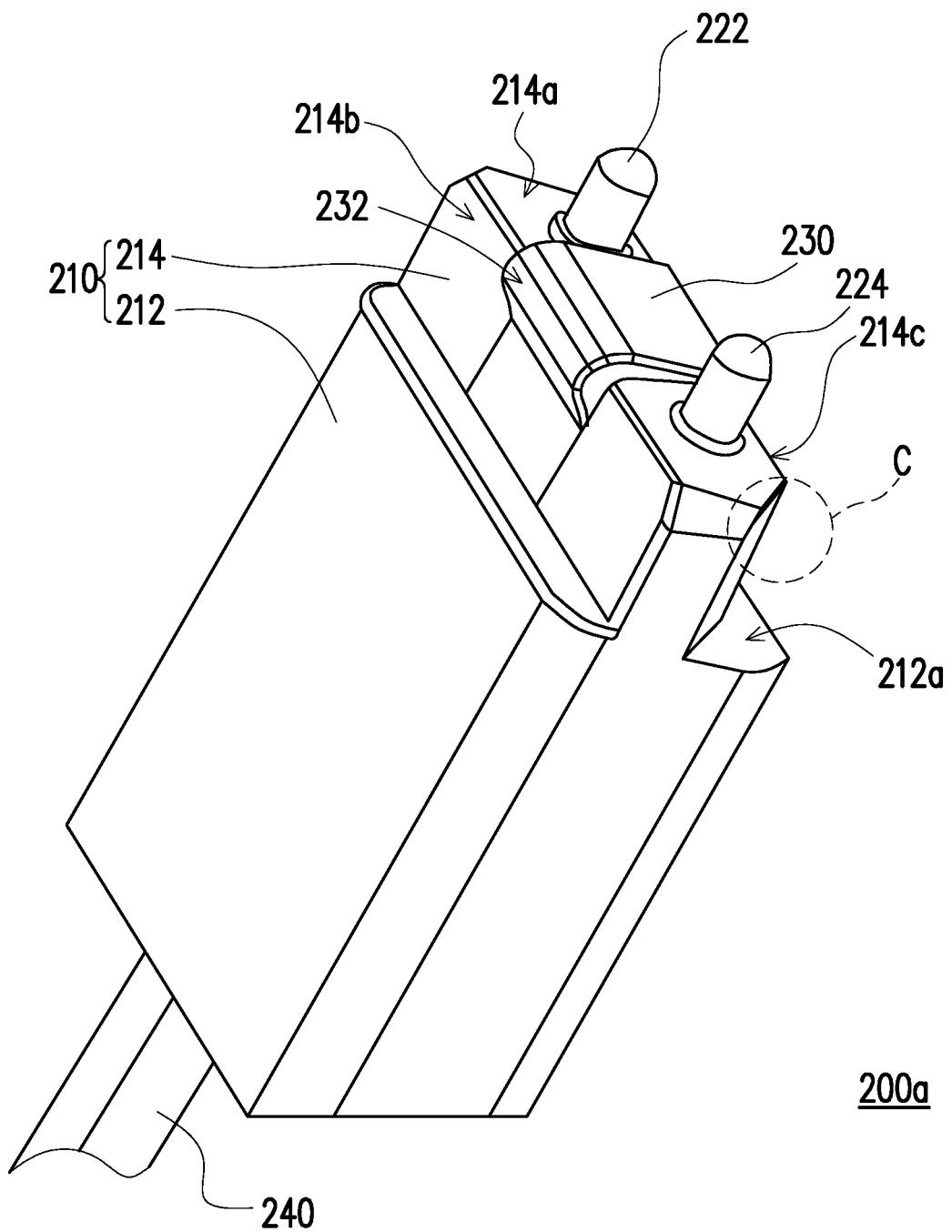
FIG. 1D is a partially enlarged schematic view showing a charging plug of the charging structure in FIG. 1A.
Figure 1E:
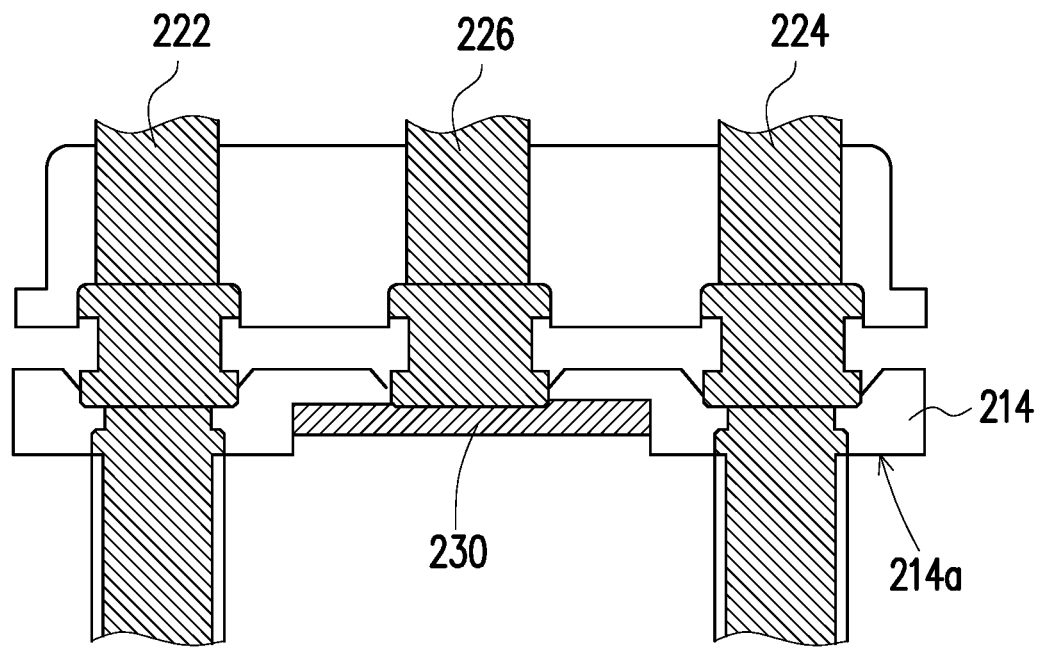
FIG. 1E is a partially enlarged schematic view showing the charging plug in FIG. 1D.

FIG. 1A is a perspective schematic view showing a charging structure of an embodiment of the disclosure. FIG. 1B is a perspective cross-sectional schematic view showing a part of the charging structure in FIG. 1A. FIG. 1C is a partially enlarged schematic view showing a casing of the charging structure in FIG. 1A. FIG. 1D is a partially enlarged schematic view showing a charging plug of the charging structure in FIG. 1A. FIG. 1E is a partially enlarged schematic view showing the charging plug in FIG. 1D. It should be noted here, for the convenience of explanation, FIG. 1A is a combination of bottom view and three-dimensional view, FIG. 1B is a combination of top view and three-dimensional and cross-sectional view, and the charging wires are omitted in both FIG. 1A and FIG. 1B.

Referring to FIGS. 1A, 1B, 1C, and 1D, a charging structure 10a of the present embodiment includes a casing 100a and a charging plug 200a. The casing 100a has a charging slot 110, at least one slot 120a (only one slot is shown in FIGS. 1A, 1B, and 1C), and two charging terminals 132 and 134. The slot 120a communicates with the charging slot 110, and the charging terminals 132 and 134 are located in the charging slot 110. The charging plug 200a is detachably plugged in the charging slot 110 of the casing 100a. A charging plug 200a includes a housing 210, two charging pins 222 and 224, and an elastic piece 230. The housing 210 includes a main body portion 212 and a protruding portion 214, the main body portion 212 has an arrangement surface 212a, and the protruding portion 214 is connected to the main body portion 212 and located on the arrangement surface 212a. The protruding portion 214 has an upper surface 214a, the first side surface 214b, and the second side surface 214c. The first side surface 214b and the second side surface 214c are opposite each other and connect to the upper surface 212a. The charging pins 222 and 224 are disposed in the housing 210 and extend out of the protrusion portion 214, the charging pins 222 and 224 are separated from each other and arranged in parallel. The elastic piece 230 is disposed on the protruding portion 214 of the housing 210 and located between the charging pins 222 and 224. The elastic piece 230 covers the first side surface 214b, the upper surface 214a and the second side surface 214c and has at least one positioning portion 232. When the charging plug 200a is plugged in the charging slot 110 of the casing 100a, the charging pins 222 and 224 are respectively in contact with the charging terminals 132 and 134, and the positioning portion 232 of the elastic piece 230 engages with the slot 120a, so that the charging plug 200a is fixed to the casing 100a.

To be more specific, the casing 100a in the present embodiment is a main body of an electronic product as an example, and the electronic product is a wristband, a watch, a mobile phone, a game machine, or a navigator, for example, but the disclosure is not limited thereto. As shown in FIG. 1A and FIG. 1B, the charging slot 110 is embodied as being located on a bottom surface 101 of the casing 100a. Certainly, in other embodiments not shown, the charging slot may also be designed on the side surface of the casing, may have a better flexibility in design, and may be adapted to various positions in spatial and structural design. The slot 120a communicates with the charging slot 110 and the outside environment, and may be considered as a drain slot, so that moisture may be discharged from the slot 120a, and is not easily accumulated in the charging slot 110. In other words, the charging structure 10a of the present embodiment has waterproof function, so as to ensure that the charging terminals 132 and 134 are not easily oxidized or corroded and have a better structural reliability.

Referring to FIG. 1C, the casing 100a of the present embodiment further has a reset terminal 136, the reset terminal 136 is disposed in the charging slot 110 and located between the charging terminals 132 and 134. Next, referring to FIGS. 1D and 1E, the charging plug 200a of the present embodiment further includes a reset pin 226, and the reset pin 226 is disposed in the housing 210 and located between the charging pins 222 and 224. Herein, the elastic piece 230 covers the reset pin 226. As shown in FIG. 1B, when the charging plug 200a is plugged into the charging slot 110, the reset pin 226 is corresponding to the reset terminal 136 and the elastic piece 230 is in contact with the reset terminal 136. Furthermore, the outer edge of the second side surface 214b of the protruding portion 214 of the housing 210 has a plurality of chamfered bevels C, which can prevent the reverse insertion into the charging slot 110. The positioning portion 232 of the elastic piece 230 is located at a junction of the upper surface 214a and the first side surface 214c of the protruding portion 214, and the positioning portion 232 is an oblique arm guiding structure. In addition to the positioning portion 232 being designed to be easily assembled, at the positioning moment, the charging plug 200a and the casing 100a may be smoothly guided to the right position and provide the feel of positioning being completed when reaching the right position, and further can ensure a stable connection between the charging pins 222 and 224 and the charging terminals 132 and 134. Briefly, in the present embodiment, the chamfered bevel C and the positioning portion 232 are located on different surfaces of the protruding portion 214 of the housing 210, so as to have anti-reverse insertion/plugging, which provides functions of guiding to the right position and stable insertion/plugging. In addition, the charging plug 200a further includes a charging wire 240, and the charging wire is connected to the main body portion 212 and is electrically connected to the charging pins 222 and 224 and the reset pin 226.

The elastic piece 230 of the charging plug 200a in the present embodiment has the positioning portion 232, and the positioning portion 232 is configured to engage with the slot 120a of the casing 100a, so that the charging plug 200a is stably plugged into the casing 100a for charging. In other words, the charging plug 200a is plugged into the charging slot 110 of the casing 100a through the elastic force stably provided by the elastic piece 230. That is to say, the charging plug 200a can output stable pressure for plugging. In addition to being designed to be easily assembled, at the positioning moment, the positioning portion 232 is also smoothly guided to the right position and provide the feel of positioning being completed when reaching the right position, and further can ensure stable connection between the charging pins 222 and 224 and the charging terminals 132 and 134, so as to greatly improve structural stability and life cycle of the charging structure 10a in the present embodiment. Furthermore, since the charging slot 110 of the casing 100a of the present embodiment is embodied as being located on the bottom surface 101 of the casing 100a. That is to say, the charging slot 110 faces downward, the slot 120a communicates with the charging slot 110 and the outside environment, so that moisture may be discharged from the slot 120a, and is not easily accumulated in the charging slot 110. Therefore, the charging structure 10a of the present embodiment has waterproof function, so as to ensure that the charging terminals 132 and 134 are not easily oxidized or corroded and have a better structural reliability. Moreover, in the present embodiment, the protruding portion 214 is designed to have the chamfered bevel C, so as to prevent the charging plug 200a from being reversely plugged into the charging slot 110 of the casing 100a. Therefore, the charging structure 10a of the present embodiment has a function of anti-reverse insertion/plug. Briefly, compared to the conventional devices, such as the seat-type charger, the magnetic and pogo pin type charging structure, clamping type charging structure, and Micro USB charging structure, the charging structure 10a of the present embodiment has advantages as good structural strength, great flexibility in design, small volume, low development cost, and long life cycle.

It should be noted, the embodiments below utilize component labels and partial content from the aforementioned embodiments, wherein identical or similar elements are labeled with identical labels, and therefore description of similar technical content will be omitted. Regarding the description of the omitted parts, reference may be made to the previous embodiment, and will not be repeated in the below embodiment.

Figure 2A:
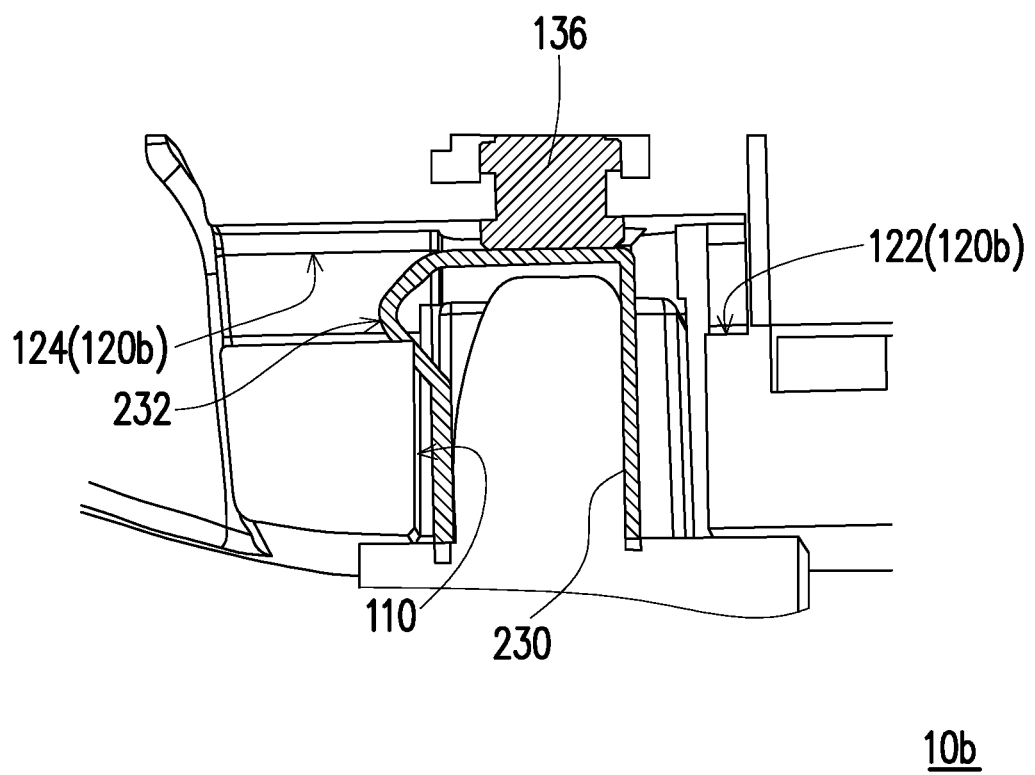
FIG. 2A is a partial cross-sectional view showing a charging structure of another embodiment of the disclosure.
Figure 2B:
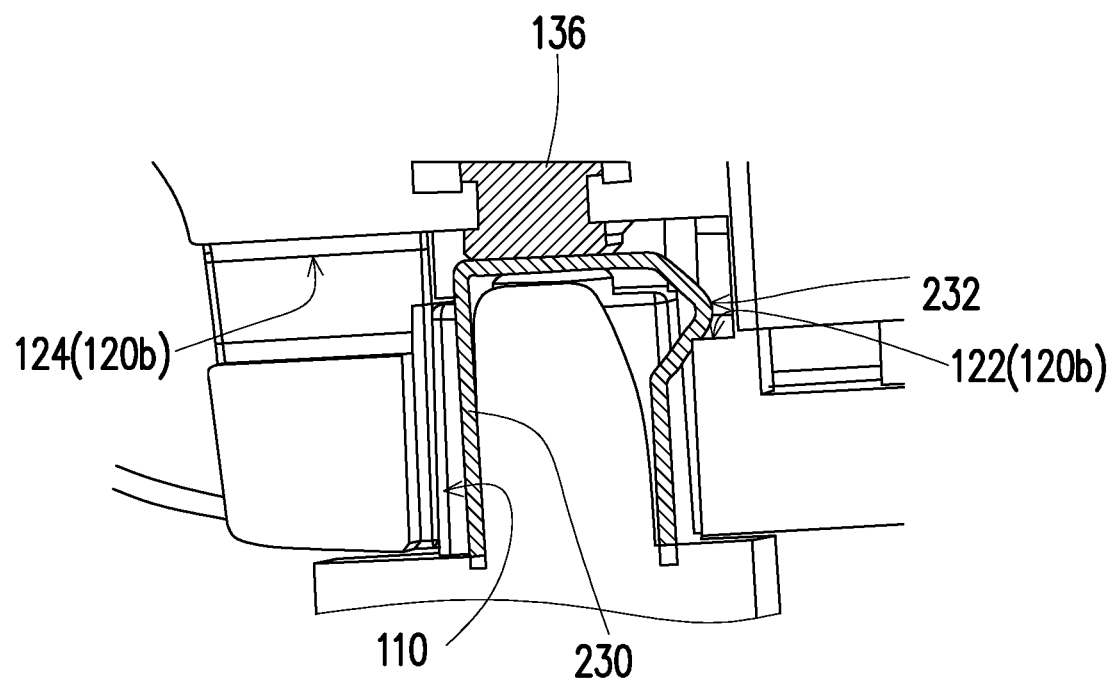
FIG. 2B is a partially cross-sectional view of reversely plugging the charging plug of the charging structure in FIG. 2A into the casing.
Figure 2C:
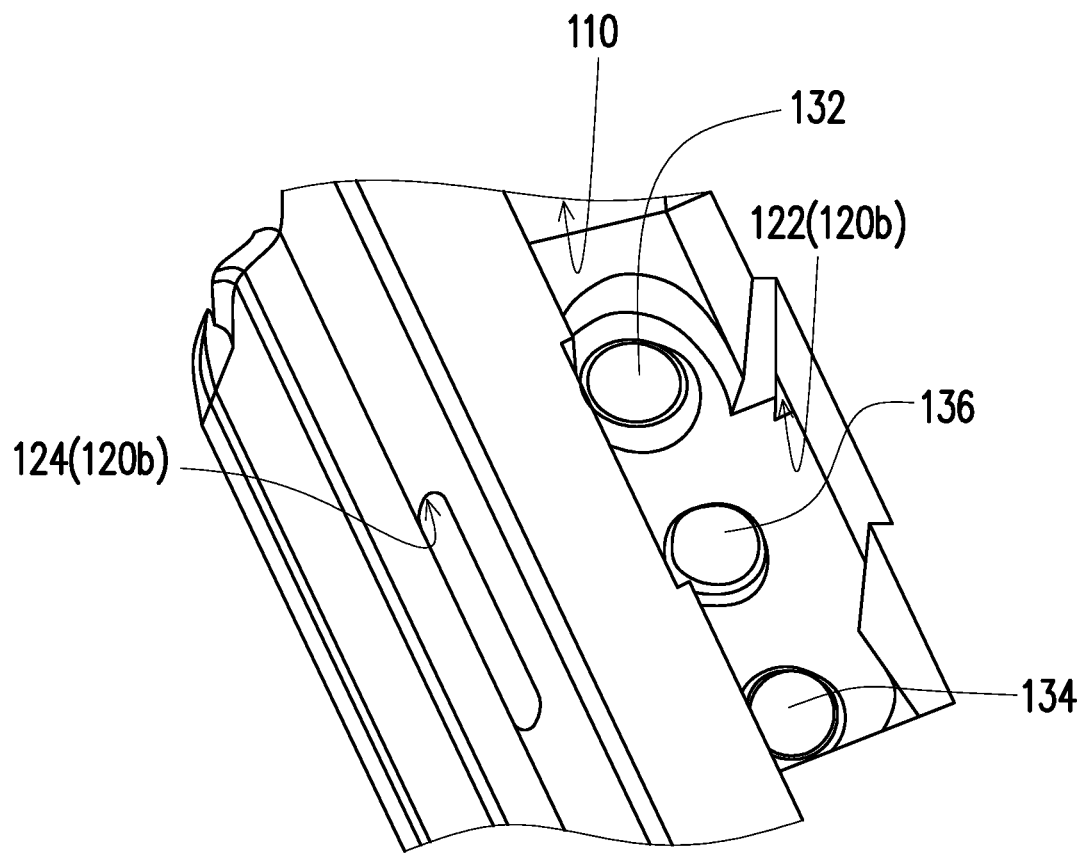
FIG. 2C is a perspective and partially enlarged schematic view showing a casing of the charging structure in FIG. 2A.
Figure 2D:
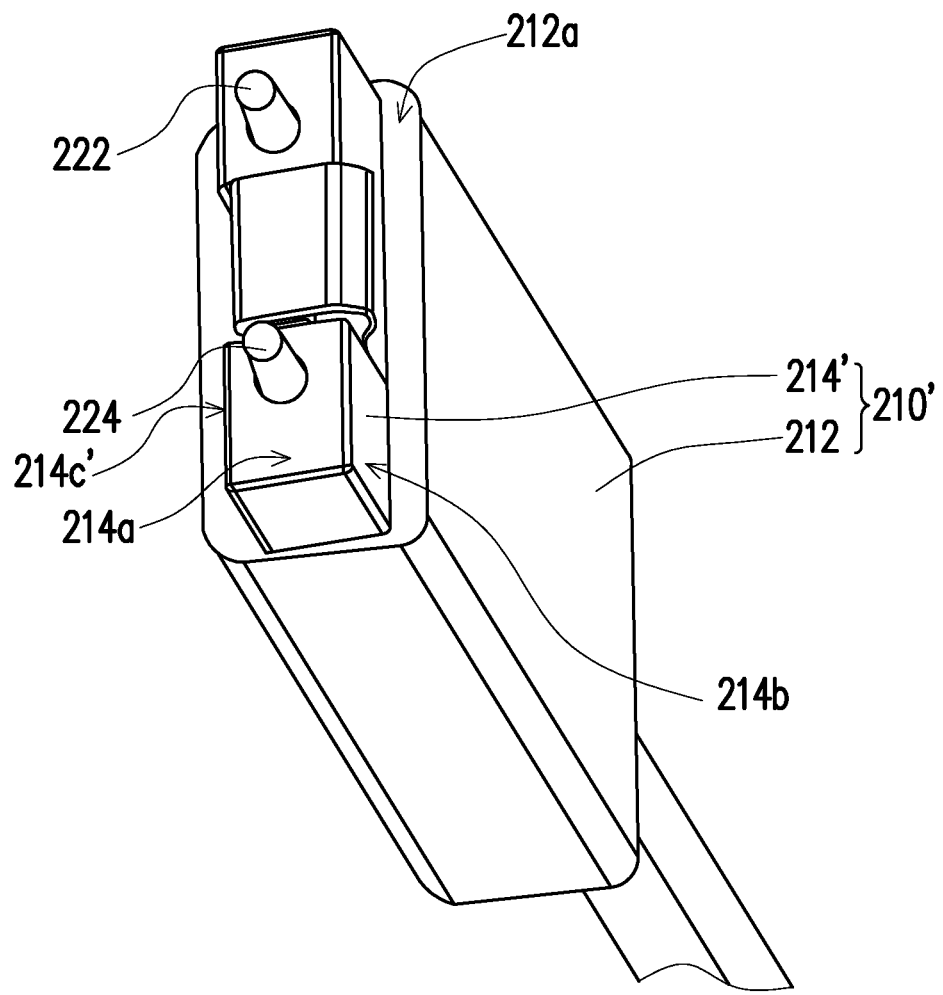
FIG. 2D is a perspective and partially enlarged schematic view showing a charging plug of the charging structure in FIG. 2A.

FIG. 2A is a partial cross-sectional view showing a charging structure of another embodiment of the disclosure. FIG. 2B is a partially cross-sectional view of reversely plugging the charging plug of the charging structure in FIG. 2A into the casing. FIG. 2C is a perspective and partially enlarged schematic view showing a casing of the charging structure in FIG. 2A. FIG. 2D is a perspective and partially enlarged schematic view showing a charging plug of the charging structure in FIG. 2A.

Referring to FIG. 1B, FIG. 2A, and FIG. 2B simultaneously, a charging structure 10b of the present embodiment is similar to the charging structure 10a in FIG. 1B. The differences are that the outer edge of a second side surface 214c' of a positioning portion 214' of a housing 210' does not have a plurality of chamfered bevels. In other words, when the design of the charging pins 222 and 224 is a non-directional design, a charging plug 200b may be plugged into a casing 100b in both directions without direction restrictions. To be more specific, referring to FIG. 2A, FIG. 2B, FIG. 2C, and FIG. 2D simultaneously, the at least one slot 120b of the casing 100b in the present embodiment includes a guiding slot 122 and a drain slot 124. The guiding slot 122 is located in the casing 100b and the charging slot 110 communicates with the outside environment through the drain slot 124. When the charging plug 200b is plugged into the charging slot 110, the positioning portion 232 of the elastic piece 230 may engage with the drain slot 124 (FIG. 2A) or the guiding slot 122 (FIG. 2B). Briefly, the design of the charging pins 222 and 224 does not provide anti-reverse insertion/plug, the charging plug 200b may be plugged into the casing 100b in both directions without direction restrictions.

It is worth mentioning that, in other embodiments not shown, the elastic piece may have two positioning portions that are respectively located at the junction of the upper surface and the first side surface of the protruding portion and the junction of the upper surface and the second side surface of the protruding portion, and that respectively engage with the guiding slot and the drain slot of the casing, so as to achieve an effect of double-sided engagement, which still falls within scope of the disclosure.

In summary, in the design of the charging plug of the disclosure, the elastic piece has a positioning portion configured to engage with the slot of the casing. Therefore, through the structural engagement method, the charging plug is firmly plugged into the casing for charging. As a result, the structural stability of the charging structure including the charging plug is greatly improved. In addition, since the charging slot of the casing is embodied as being located on the bottom surface of the casing, and the slot communicates with the charging slot and the outside environment, so that moisture may be discharged from the slot and is not easily accumulated in the charging slot. Therefore, the charging structure of the disclosure has functions of waterproof and drainage, so as to ensure that the charging terminals are not easily oxidized or corroded and have a better structural reliability. Briefly, compared to the conventional devices, such as the seat-type charger, the magnetic and probe pin type charging structure, the clamping type charging structure, and the Micro USB charging structure, the charging structure of the disclosure has advantages as good structural strength, great flexibility in design, small volume, low development cost, and long life cycle.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A charging plug, comprising:
   a housing, comprising:
   a main body portion, having an arrangement surface; and
   a protruding portion, connected to the main body portion and located on the arrangement surface, the protrusion portion having an upper surface, a first side surface and a second side surface, and the first side surface and the second side surface being opposite each other and connecting to the upper surface;

two charging pins, disposed in the housing and extending out of the protrusion portion, the charging pins being separated from each other and arranged in parallel; and an elastic piece, disposed on the protruding portion of the housing and located between the charging pins, wherein the elastic piece covers the first side surface, the upper surface and the second side surface and has at least one positioning portion, and the positioning portion is configured to be engaged with at least one slot of a casing.

2. The charging plug as recited in claim 1, further comprising:

a reset pin, disposed in the housing and located between the charging pins, wherein the elastic piece covers the reset pin.

3. The charging plug as recited in claim 1, wherein the positioning portion of the elastic piece is located at a junction of the upper surface and the first side surface of the protruding portion.

4. The charging plug as recited in claim 3, wherein the outer edge of the second side surface of the protruding portion has a plurality of chamfered bevels.

5. A charging structure, comprising:

a casing, having a charging slot, at least one slot and two charging terminals, the slot communicating with the charging slot, and the charging terminals being located in the charging slot; and a charging plug, detachably plugged in the charging slot of the casing, the charging plug comprising:

a housing, comprising:

a main body portion, having an arrangement surface; and a protruding portion, connected to the main body portion and located on the arrangement surface, the protrusion portion having an upper surface, a first side surface and a second side surface, and the first side surface and the second side surface being opposite each other and connecting to the upper surface;

two charging pins, disposed in the housing and extending out of the protrusion portion, the charging pins being separated from each other and arranged in parallel; and an elastic piece, disposed on the protruding portion of the housing, and located between the charging pins, the elastic piece covering the first side surface, the upper surface, and the second side surface and having at least one positioning portion, wherein, when the charging plug is plugged in the charging slot, the charging pins are respectively in contact with the charging terminals, and the positioning portion of the elastic piece engages with the slot, so that the charging plug is fixed to the casing.

6. The charging structure as recited in claim 5, wherein the charging plug further comprises:

a reset pin, disposed in the housing and located between the charging pins, wherein the elastic piece covers the reset pin.

7. The charging structure as recited in claim 6, wherein the casing further has a reset terminal disposed in the charging slot and located between the charging terminals, when the charging plug is plugged into the charging slot, the reset pin is corresponding to the reset terminal and the elastic piece is in contact with the reset terminal.

8. The charging structure as recited in claim 5, wherein the positioning portion of the elastic piece is located at a junction of the upper surface and the first side surface of the protruding portion.

9. The charging structure as recited in claim 8, wherein the outer edge of the second side surface of the positioning portion has a plurality of chamfered bevels.

10. The charging structure as recited in claim 5, wherein the at least one slot comprises a guiding slot and a drain slot, the guiding slot is located in the casing and the charging slot communicates with outside through the drain slot, when the charging plug is plugged into the charging slot, the positioning portion of the elastic piece engages with the guiding slot or the drain slot.

* * * * *